(12) United States Patent
Warkotsch

(10) Patent No.: US 6,282,799 B1
(45) Date of Patent: Sep. 4, 2001

(54) APPARATUS AFFIXING A WHEEL-ALIGNMENT SENSOR ON A MOTOR-VEHICLE WHEEL RIM

(75) Inventor: Dirk Warkotsch, Wettmar (DE)

(73) Assignee: Haweka Auswuchttechnik Horst Warkotsch GmbH, Burgwedel (DE)

( * ) Notice: Subject to any disclaimer, the term of this patent is extended or adjusted under 35 U.S.C. 154(b) by 0 days.

(21) Appl. No.: 09/616,948

(22) Filed: Jul. 14, 2000

Related U.S. Application Data

(63) Continuation of application No. PCT/EP98/07479, filed on Nov. 20, 1998.

(30) Foreign Application Priority Data

Feb. 26, 1998 (DE) .............................................. 198 07 829

(51) Int. Cl.⁷ .................................................. G01B 5/255
(52) U.S. Cl. .......................................... 33/203.18; 33/203
(58) Field of Search ................................ 33/203.18, 203, 33/203.19, 203.2, 203.21

(56) References Cited

U.S. PATENT DOCUMENTS

| | | | |
|---|---|---|---|
| 4,185,917 | 1/1980 | Alsina | 33/203.19 |
| 4,377,038 | * 3/1983 | Ragan | 33/203.18 |
| 4,407,073 | * 10/1983 | Nilsson et al. | 33/203.18 |
| 4,569,140 | * 2/1986 | Hobson | 33/203.18 |
| 5,446,967 | 9/1995 | Gender | 33/203.18 |

FOREIGN PATENT DOCUMENTS

| | | | |
|---|---|---|---|
| GM7806047 | 9/1979 | (DE) . | |
| G8601561 | 4/1986 | (DE) . | |
| 3608424 | * 9/1987 | (DE) | 33/203.18 |
| G8907578 | 10/1989 | (DE) . | |

OTHER PUBLICATIONS

International Preliminary Examination Report dated May 23, 2000 (11 pages) (No translation).

* cited by examiner

*Primary Examiner*—Christopher W. Fulton
(74) *Attorney, Agent, or Firm*—Shlesinger, Arkwright & Garvey LLP

(57) ABSTRACT

Device for affixing the wheel-alignment sensor is mounted on a main body at a given reference direction to it. Three support arms are mounted on the main body and run substantially radially in a plane which is perpendicular to the reference direction. Spacers are mounted on the support arms in transversely displaceable manner thereto. The spacer ends that will constitute a three-point support on a wheel rim are situated in a plane which is perpendicular to the reference direction. Element(s) to affix the main body to the wheel rim are provided. At least one of the spacers (24, 54) is adjustable transversely to its mounting arm. In this manner the position of the spacers can be matched to different pitches of wheel affixing nuts.

14 Claims, 3 Drawing Sheets

APPARATUS AFFIXING A WHEEL-ALIGNMENT SENSOR ON A MOTOR-VEHICLE WHEEL RIM

CROSS-REFERENCE TO RELATED APPLICATIONS

This application is a continuation of PCT Application No. PCT/EP98/07479, filed Nov. 20, 1998, which claims the priority of German application no. 198 07 829.3, filed Feb. 26, 1998, and each of which is incorporated herein by reference.

FIELD OF THE INVENTION

The invention relates to apparatus for fastening a wheel-alignment sensor to a wheel-rim of a motor vehicle.

BACKGROUND OF THE INVENTION

Apparatus of this kind are widely known. They comprise a main body to which the wheel-alignment sensor is affixed at a predetermined reference direction to said main body. Three coplanar and substantially radial support arms are present on the main body, longitudinally adjusted spacers being mounted on the arms and the ends of which implement a three-point rest on the wheel rim being situated in a plane perpendicular to said relative direction. Means to keep the apparatus on the rim also are provided.

The wheel-alignment sensor held by such apparatus against a motor-vehicle wheel rim illustratively may be a spirit level and/or a laser sensor measuring a wheel's camber, track width, caster and the like.

In order to match the spacer to various rim diameters, it is known to fit the arms with elongated slots allowing clamping a spacer in various positions along the mounting arm to pass a tightening screw allowing clamping a spacer at various sites along the mounting arm. However this design incurs the drawback that because the support arms are fixed in their directions, the spacers cannot always be moved to come to rest between affixation screws of the vehicle wheel because, in different types of vehicles, these affixation screws are at different angular spacings, in other words, they will be present in different numbers. To allow measurement when there are different angular spacings, the state of the art has required keeping a supply of several affixation apparatus matched to different divisions, or numbers of, affixation screws.

U.S. Pat. 5,446,967 discloses an apparatus for fastening a wheel-alignment sensor to a wheel-rim of a motor vehicle which is based on a wholly different principle than the known ones cited above. In the apparatus of this U.S. patent, the arms are not support arms but adjusting rods mounted in radially displaceable manner in slots in the main body. Moreover the bases are not designed as spacers, rather they are affixation means to directly use one affixation screw or lug nut each for affixation to the wheel rim. It is critical for this known apparatus that there be four bases which must be screwed onto four affixation screws. The adjusting rods are radially tightened pairwise using opposite threads at a manually driven knurled disk, the main body is made symmetrical relative the wheel axis and furthermore inevitable play between the adjusting rods and the main body as well as between the adjusting rods and the bases pivotably affixed to them can be eliminated.

OBJECTS AND SUMMARY OF THE INVENTION

The objective of the invention is to create apparatus for affixing a wheel-alignment sensor on a motor-vehicle's wheel rim, where said sensor shall be matchable not only to different wheel diameters but also to different divisions or number of affixation screws, whereby the spacers always can be made to rest between the affixation screws of a rim. Moreover the apparatus shall be simple and economical in design and easy to handle.

The problem of the invention is solved in that at least one spacer shall be adjustable transversely to its mounting arm.

The basic concept of the invention is to match the position of the spacers to different divisions of wheel fastening nuts. This goal can be achieved already if only one of the spacers shall be transversely adjustable to its mounting arm because frequently two support arms can be made to rest on the rim between the affixation screws on account of the larger angular intervals when there are different spacings between said screws. In that case it suffices to transversely adjust the third spacer relative to its mounting arm in order to preclude it from hitting an affixation screw and instead to come to rest adjacently on the rim.

The basic concept of the invention can be reduced to practice in different ways. In one embodiment of the invention, the spacer is mounted on a pivot arm mounted to its mounting arm and pivotable about a pivot running parallel to the reference direction. By pivoting the pivot arm, the position of the spacer can be changed in simple manner transversely to its mounting arm and accordingly it can be changed along the conceptual graduated circle of affixation screws and be matched to the angular intervals between the particular affixation screws.

As already mentioned above, it may suffice if only one spacer shall be adjustable transversely to its mounting arm. Matchability however shall be enhanced if two of the spacers are adjustable transversely to their support arms. In that case the third mounting arm need not be adjustable.

In a variant of the embodiment of the invention of the spacer being mounted on a pivot arm at the mounting arm, said pivot arm comprises a rest surface perpendicular to the reference direction and resting against a surface perpendicular to the said reference direction, tightening means being provided to clamp the pivot arm on the mounting arm. Said rest surfaces always assure accurate alignment relative to the main body and hence also to the reference direction defined relative to it. At the same time this embodiment variant allows easy adjustment of the spacer along its mounting arm in that, in a further development of this embodiment, the tensioning means consist of tightening screws constituting the pivot and each passing through an elongated slot to enter a mounting arm and each being screwed into a threaded borehole in this pivot arm.

In a basically different practical implementation of the concept of the invention, one mounting arm is pivotable about an axis parallel to the reference direction. Pivoting the mounting arm entails a sideways displacement of the spacer mounted on said arm, as a result of which this spacer can be made to reliably rest next to a wheel nut on a wheel rim.

As is the case in the basic design described earlier, only one of the pivot arms need be pivotable in this latter embodiment. Matchability however shall be enhanced if two support arms pivoting about a pivot axis which is parallel to the reference direction shall be used. In especially advantageous manner, the two pivotable support arms shall be pivotable about a common axis. During the pivoting motion, the spacers affixed to said arms only move sideways, not in the direction of the arms, and as a result radial matching in the sense of adapting to different conceptual graduated circles of affixation screws shall not be required.

Appropriately the pivotable support arms are fork-shaped relative to their pivot bearings and shall closely enclose the disk-shaped main body. As a result they will be connected in a practically play-free manner to the main body to which they may furthermore be clamped to eliminate any play.

BRIEF DESCRIPTION OF THE DRAWINGS

The invention is elucidated below by embodiments shown in the attached drawings.

DETAILED DESCRIPTION OF THE INVENTION

Figure 1:
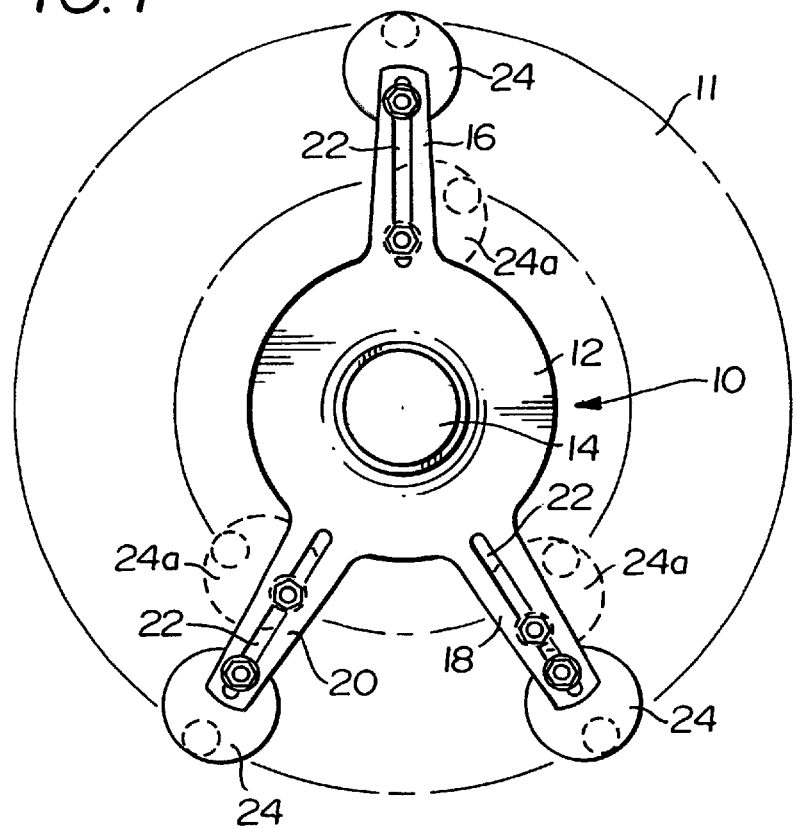
FIG. 1 is a front view of a first embodiment of the apparatus of the invention.

FIG. 1 shows an embodiment of apparatus 10 of the invention which is applied against a truck's wheel rim 11 indicated in merely schematic manner. The apparatus 10 comprises a main body 12 fitted with a cylindrical seat 14 directed in a reference direction and designed to receive an omitted wheel-alignment sensor.

The main body 12 is fitted with support arms 16, 18, 20 situated in a plane perpendicular to the seat 14. Each mounting arm 16, 18, 20 comprises an elongated slot 22 in which is held a spacer 24. The spacers 24 are displaceable along the slots 22 and simultaneously are pivotable, whereby they can assume arbitrarily shifted and pivoted positions. Illustratively the positions 24a shown in dashed lines may be assumed besides those shown in solid lines.

Figure 2:
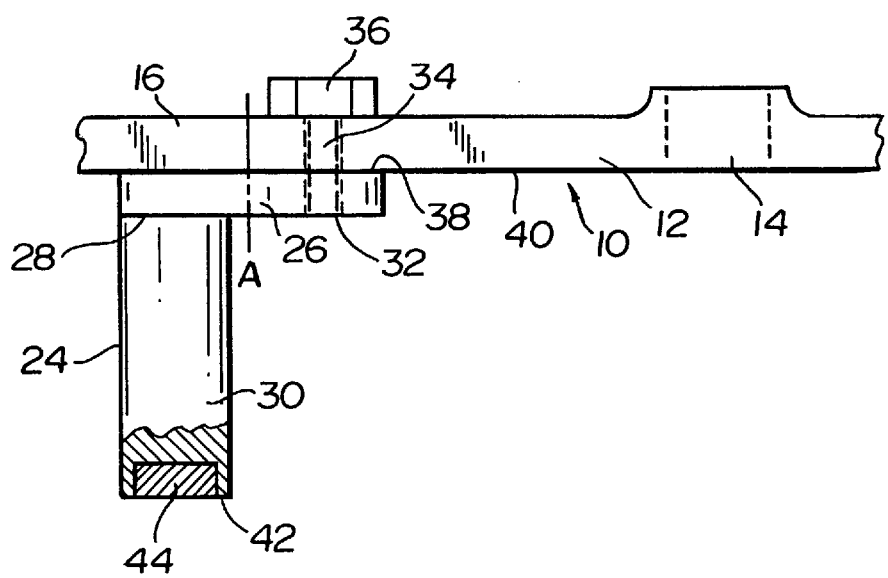
FIG. 2 is a side view of part of the embodiment of FIG. 1.

FIG. 2 shows on a larger scale the spacers 24 with respect to a portion of a mounting arm 16. The spacer 24 comprises a base 26 at the bottom side 28 of which a cylinder 30 dedicated to a substantial portion of the spacer 24 is affixed. The cylinder 30 is mounted eccentrically to the lower side 28 of the disk-shaped base 26, the central axis of said base 26 being indicated by a line A. A threaded borehole 32 in the base 26 is situated also eccentrically and opposite to the connection site of the cylinder 30 and the base 26. A screw 34 fitted with a knob head 36 passes through the elongated slot 22 and engages the threaded borehole 32. Tightening the screw 34 by means of the knob head 36 compresses and hence affixes a rest surface 38 of the base 26 against a rest surface 40 of the arm 16. The cylinder 30 is fitted at its lower end face 42 with a magnetic insert 44 by means of which the apparatus of the invention is detachably affixed to the rim 1.

Figure 3:
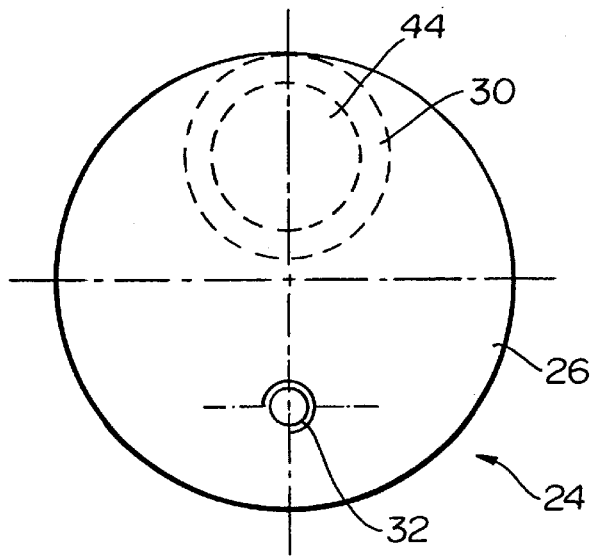
FIG. 3 is a top view of the embodiment of FIG. 1.

FIG. 3 is a topview of the spacer 24, showing the eccentric configuration of the cylinder 30 and of the threaded borehole 32 relative to the disk-shaped base 26 which in a practical manner constitutes a pivot arm by means of which the cylinder 30 is pivotable about the screw 34, i.e. the threaded borehole 32.

Figure 4:
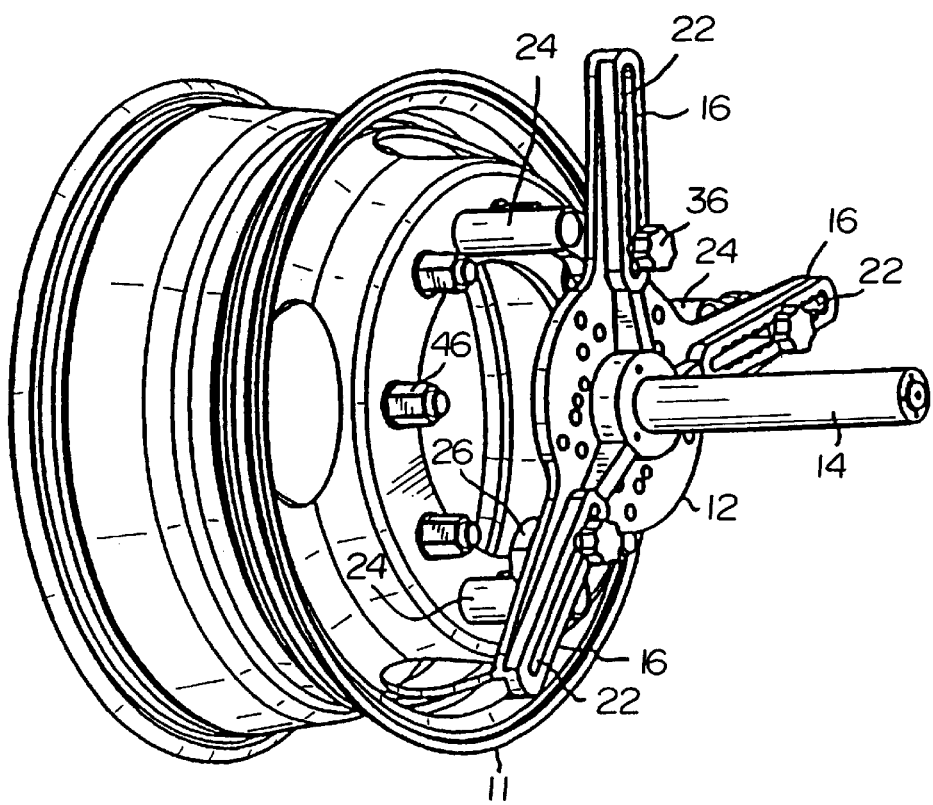
FIG. 4 is a perspective of the apparatus of FIGS. 1 through 3 when resting against a vehicle wheel.

FIG. 4 is a perspective and detailed view of the apparatus of FIG. 1 when mounted on the rim 11. The spacers 24 are situated between fastening nuts 46 to the vehicle-rim 11, said spacers 24 being configured in different pivoted positions.

Figure 5:
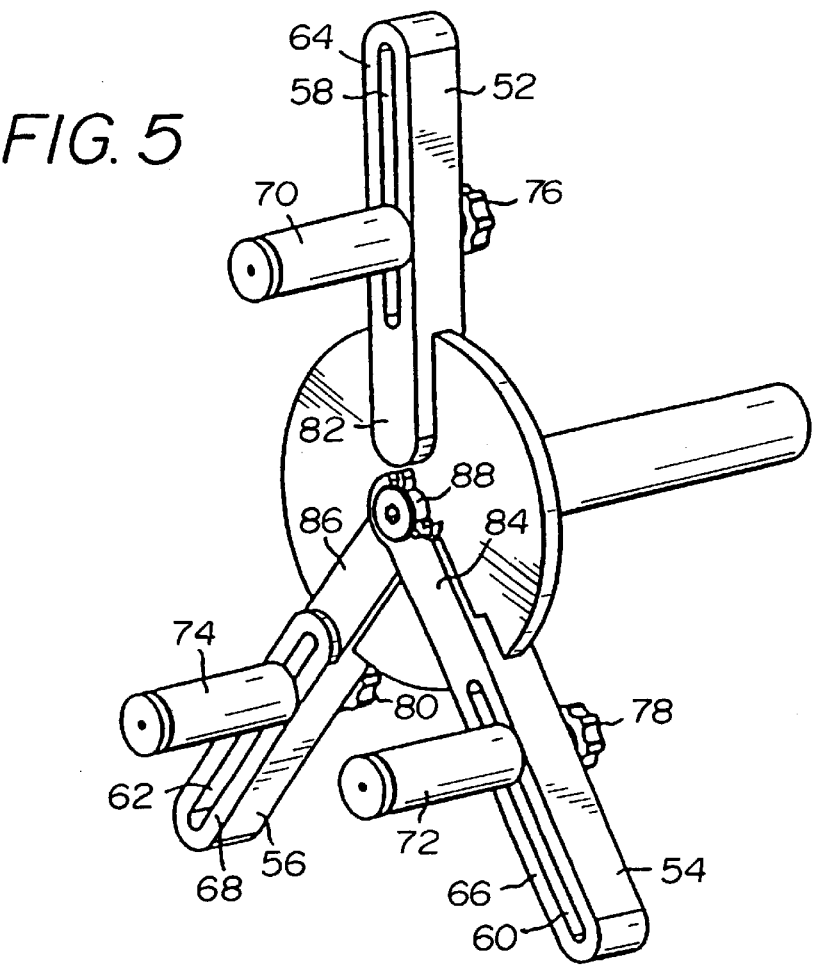
FIG. 5 is a perspective of a second embodiment of the invention.

FIG. 5 shows a second embodiment of the invention. A seat 48 receiving an omitted wheel-alignment sensor is situated centrally at and perpendicularly to a disk-shaped main body 50 onto which is are mounted support arms 52, 54 and 56 comprising elongated slots 58, 60 and 62 and rest, surfaces 64, 66, 68 against which rest. respectively, spacers 70, 72, 74, said rest surfaces being clamped by screws which pass through the elongated slots 58, 60, 62 and which are fitted with knob heads 76, 78, 80, as a result of which the spacers 70, 72, 74 assume an accurately defined position relative to the support arms 52, 54, 56 and, by the intermediary of the disk-shaped main body 50, relative to the main body 48 as well.

By means of a fork-shaped end 82, the mounting arm 52 encloses the main body 50 and is rigidly joined to it.

The support arms 54 and 56 also are fitted with fork-shaped ends 84 and 86, which however are not rigidly joined to the disk-shaped main body 50 but instead are pivotable about a central pivot 88. Consequently the circumferential position of the spacers 72 and 74 relative to a conceptual graduated circle will be adjustable, said circle being determined by the radial position of the spacers 70, 72, 74 relative to the pivot 88 and hence also relative to the seat 48.

Figure 6:
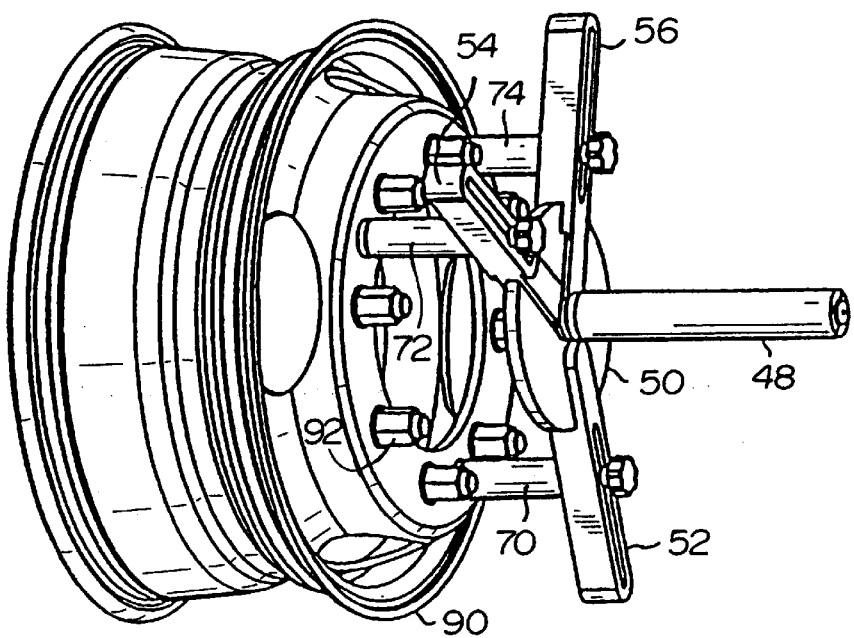
FIG. 6 is a perspective of embodiment of FIG. 5 being used in a concrete example.

FIG. 6 is a perspective of the embodiment of FIG. 5 with the apparatus resting against a vehicle wheel-rim 90. Because the support arms 54, 56 have been pivoted, the spacers 70, 72, 74 are configured freely between the fastening nuts lug nuts 92. By pivoting the support arms, the apparatus can be matched to the most diverse angular arrays of fastening nuts.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. Apparatus to fasten a wheel-alignment sensor to a wheel-rim of a motor vehicle, comprising:

a main body, means provided on the main body for affixing a wheel-alignment sensor in a predetermined reference direction relative to the main body, three substantially radial mounting arms situated in a plane which is perpendicular to the predetermined reference direction, bases associated with the radial mounting arms and adjustable in the directions of these radial mounting arms, the ends of which radial mounting arms are situated in a plane which is perpendicular to the predetermined reference direction, means provided for affixing the main body to a motor-vehicle wheel-rim, the means for affixing the main body to a wheel-rim is configured as means for affixing the main body against a wheel-rim, the bases are configured as spacers and are each mounted at the ends of the three radial mounting arms as support arms, the ends of the spacers are end faces configured to rest against a wheel-rim between affixation holes, and at least one of the spacers is transversely adjustable relative to the longitudinal axis of its radial mounting arm and the at least one spacer can be clamped in an adjusted position.

2. Apparatus as claimed in claim 1, wherein the spacer is situated in each case at a pivot arm mounted at its radial mounting arm and pivotable about a pivot.

3. Apparatus as claimed in claim 2, wherein the pivot arm comprises a rest surface which is perpendicular to the determined reference direction and which rests against a rest surface perpendicular to the predetermined reference direction at the radial mounting arm, and a means for tightening is provided to clamp the pivot the radial mounting arm.

4. Apparatus as claimed in claim 3, wherein the tightening means consists of screws constituting the pivots and passing through an elongated slot to enter the mounting arm and to be screwed into a threaded borehole in the radial mounting arm.

5. Apparatus as claimed in claim 1, wherein one of the radial mounting arms is pivotable about a pivot axis perpendicular to the predetermined reference direction.

6. Apparatus as claimed in claim 5, wherein two of the radial mounting arms are support arms are pivotable about a pivot axis extending parallel to the predetermined reference direction.

7. Apparatus as claimed in claim 6, wherein the two pivotable support arms are pivotable about one common pivot.

8. Apparatus as claimed in claim 5, wherein the main body is disk-shaped, and one of the pivotable support arms comprises a forked end in the direction of its pivot bearing and thereby tightly encloses the disk-shaped main body.

9. An apparatus for fastening a wheel-alignment sensor to a wheel-rim of a motor vehicle, comprising:

a) a body;

b) an element disposed adjacent to the body for attaching a wheel-alignment sensor in a reference direction relative to the main body;

c) a plurality of mounting arms provided on the body, the plurality of mounting arms extending outwardly away from the body in a direction transverse to the reference direction;

d) an attachment for attaching the body to a motor-vehicle wheel-rim;

e) a spacer mounted on respective ones of the plurality of mounting arms, the respective spacers being configured for resting against a wheel-rim between lug nuts of a wheel rim, in use; and f) at least one of the respective spacers being adjustable transversely relative to the longitudinal axis of its radial mounting arm, the at least one spacer being clampable in an adjusted position.

10. Apparatus as in claim 9, wherein:

a) a slot is provided on each one of the plurality of mounting arms, each spacer being movable along a respective slot.

11. Apparatus as in claim 9, wherein:

a) a fastener is provided for clamping at least one spacer in its transversely adjusted position.

12. Apparatus as in claim 9, wherein:

a) one of the plurality of mounting arms is pivotable about a pivot axis extending parallel to the predetermined reference direction.

13. Apparatus as in claim 9, wherein:

a) two of the plurality of mounting arms are pivotable about a pivot axis extending parallel to the predetermined reference direction.

14. Apparatus as in claim 13, wherein:

a) the two pivotable mounting arms are pivotable about a common pivot axis.

\* \* \* \* \*